United States Patent [19]
Noble et al.

[11] 3,870,170
[45] Mar. 11, 1975

[54] LOADING RAMP FOR PICK-UP TRUCKS AND THE LIKE

[76] Inventors: Donald E. Noble, Rt. No. 4; Robert H. Sanderson, Star Rt., both of Canton, N.Y. 13617

[22] Filed: June 6, 1973

[21] Appl. No.: 367,318

[52] U.S. Cl. .................................... 214/85, 14/72
[51] Int. Cl. ............................................. B60p 1/00
[58] Field of Search ............ 214/85, 85.1, 450, 1 A, 214/10; 14/72

[56] References Cited
UNITED STATES PATENTS

| | | | |
|---|---|---|---|
| 2,449,829 | 9/1948 | Agren | 14/72 |
| 3,613,920 | 10/1971 | Flamm | 214/85 |
| 3,711,882 | 1/1973 | Iller | 214/85 |
| 3,763,827 | 10/1973 | Burkart | 214/85 |
| 3,768,673 | 10/1973 | Nydam | 214/85 |

Primary Examiner—Albert J. Makay
Assistant Examiner—Donald W. Underwood
Attorney, Agent, or Firm—Robb & Robb

[57] ABSTRACT

A loading ramp which is forwardly retractable into and rearwardly extensible from a housing or storage compartment within the bed or base of a pick-up truck body or the like. The forward end of the ramp is provided with roller means which are guided in tracks or guideways mounted within the storage compartment and which include freely sliding tracks or guideways which may be partially withdrawn from the compartment to an extended position beyond the rear end of the truck body. The ramp is also preferably provided at its forward end with a hinged extension flap which normally is foldable rearwardly to overlie upon the main body of the ramp when the ramp is not in use, but which can be unfolded to bridge the space between the ramp proper and the rear end of the truck body in the zone of the tail-gate of the truck body when the tail-gate is open.

3 Claims, 14 Drawing Figures

PATENTED MAR 11 1975 3,870,170

LOADING RAMP FOR PICK-UP TRUCKS AND THE LIKE

The present invention relates to loading ramps, and more particularly to loading ramps for pick-up trucks, loading docks and other loading platforms, which facilitate easy movement of relatively heavy objects and/or equipment onto and off the truck or other movable or stationary load supporting platforms.

In recent years, there has been a considerable increase in the use of snowmobiles, motorcycles, power mowers and other comparable sporting and working equipment which may frequently have to be transported to places of use at a distance from their home base, but which are difficult or impossible to handle by one or two persons or by a small group of persons when attempting to load the same or unload such heavy objects from a transporting vehicle such as a pick-up truck. Accordingly, it is the primary object of our invention to provide a convenient gangplank which is carried by the pick-up truck and is normally housed within a storage compartment beneath the load-receiving platform of the truck in an out-of-the-way position so that it is fully protected from the weather and other elements when not in use, but which can be quickly and easily withdrawn from the storage compartment to provide a ramp at the rear of the truck and which can be supported by the truck on such a gentle slope or incline as to allow easy movement of the loads up and down the ramp with a minimum of physical effort. In the case of loads such as snowmobiles, motorcycles, power motors and the like, which are usually self-propelled, the ramp, when positioned for loading or unloading of the truck, allows the equipment to be safely driven up or down the ramp by its own power, if so desired, and the entire loading and unloading operations can be easily handled by one person.

Another object of our invention is to provide an improved loading ramp which is freely movable into and extensible from the storage compartment on the truck by cooperative rollers and extensible guide tracks which preferably allow the gangplank or ramp to be pivotally supported by the truck on a transverse horizontal axis at the rear of the usual tailgate of the pick-up truck body, and the ramp preferably having a hinged extension flap which may be extended therefrom forwardly of the pivotal axis of the ramp so as to bridge the zone of the tailgate.

Other and further objects and advantages of the invention will be hereinafter described or will become apparent from reference to the following description and the accompanying drawings, and the novel features thereof will be defined in the appended claims.

Figure 1:
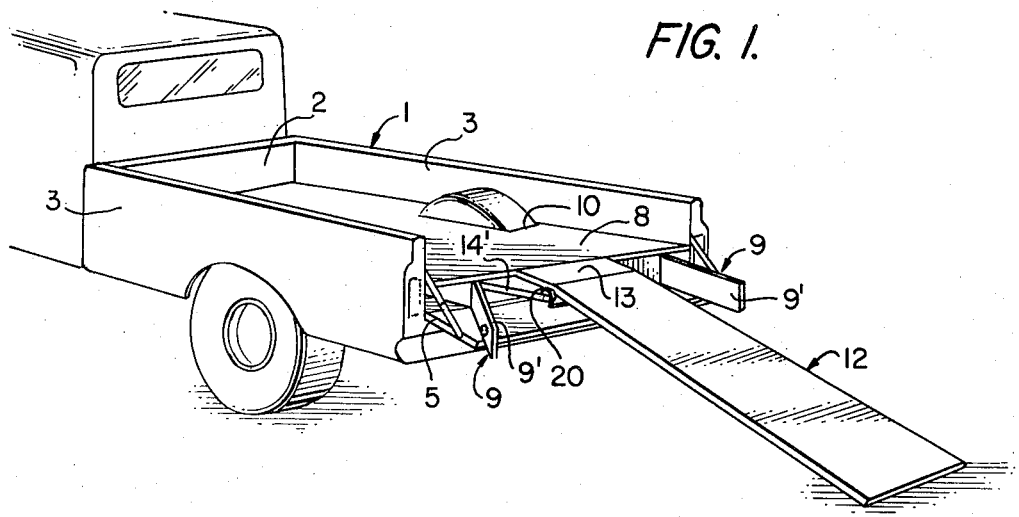
FIG. 1 is a perspective view of one embodiment of our invention as applied to a conventional pick-up truck, with the loading ramp or gangplank shown in its extended or loading position as when in use.

Like reference characters designate corresponding parts in the various figures of the drawings, wherein 1 generally denotes the body of a conventional pick-up truck of the type to which our invention is particularly applicable, although not exclusively limited thereto. The body 1 includes the usual transversely extended forward wall 2, and side walls 3,3 extending longitudinally of the body at the opposite sides of the bed or floor 4. The rear end of the body 1 is preferably provided with the usual tailgate 5 which is hingedly connected to the body so as to normally assume an upright or closed position at the rear end of the body, as maintained by suitable latch means or other appropriate fasteners, but which may be released to allow the tailgate to be swung open to a rearwardly extended, substantially horizontal position preferably flush with the bed or floor 4 of the body.

Figure 2:
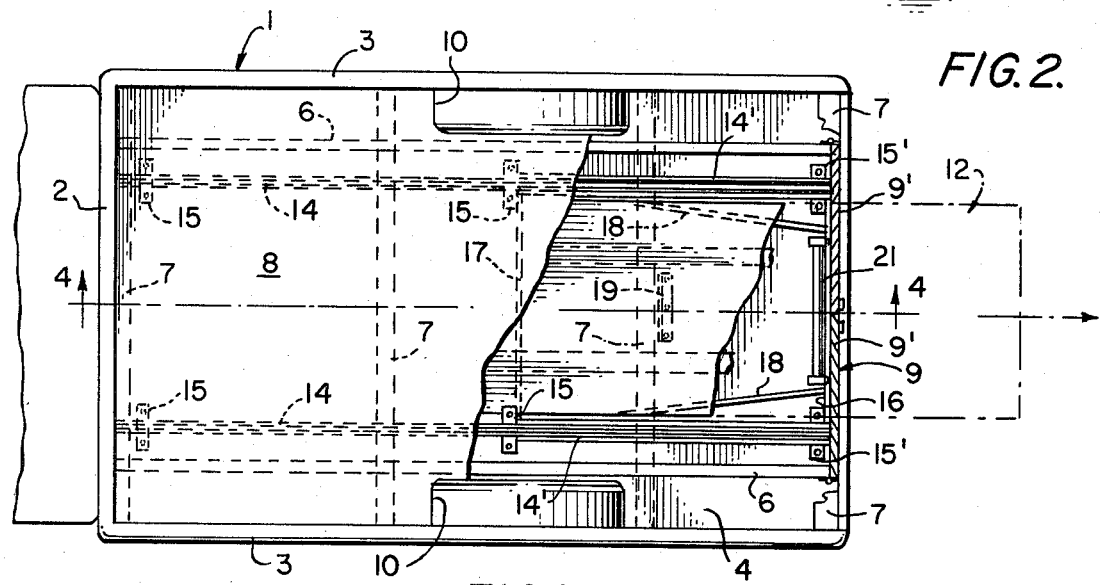
FIG. 2 is a top plan view, with a portion of the elevated load-receiving deck or platform and the gangplank broken away so as to expose the trackways and other details of the storage compartment beneath the platform.
Figure 3:
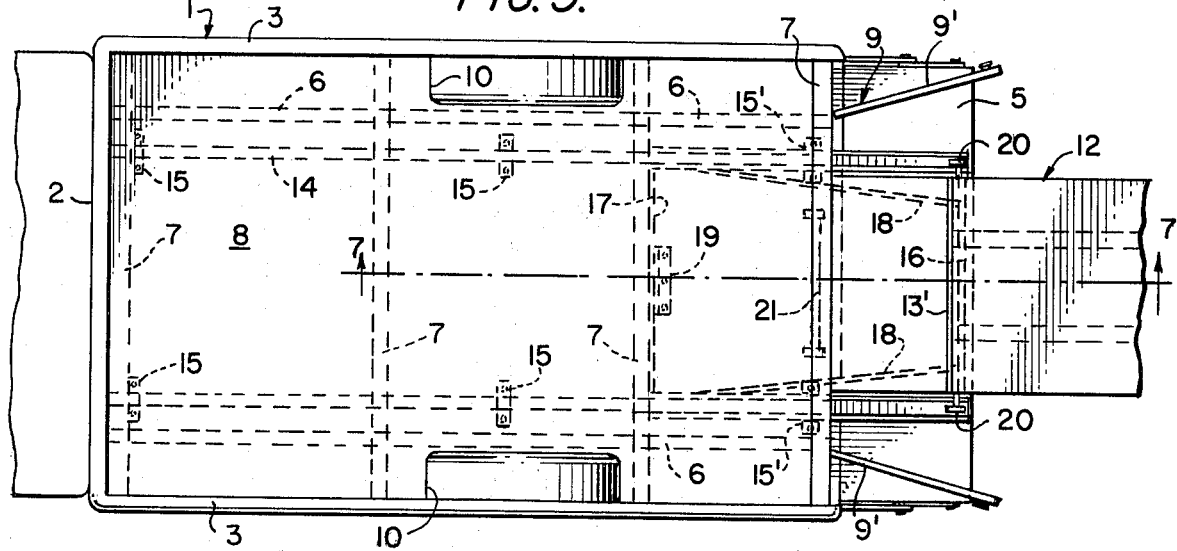
FIG. 3 is a top plan view similar to FIG. 2, with the gangplank in its fully extended position but partially broken away at its rearmost end.
Figure 4:
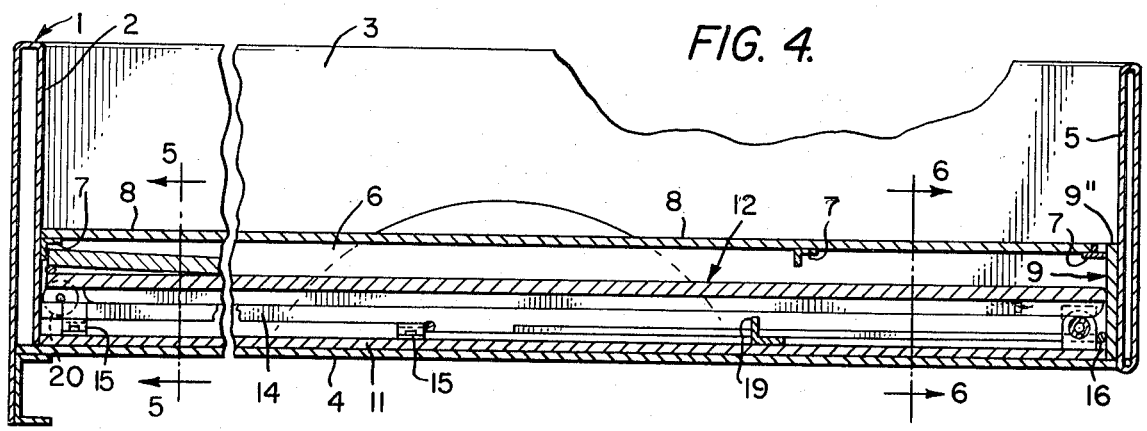
FIG. 4 is a longitudinal sectional view as taken on line 4—4 of FIG. 2, with the gangplank fully retracted and stored away in the storage compartment within the body of the pick-up truck.
Figure 5:
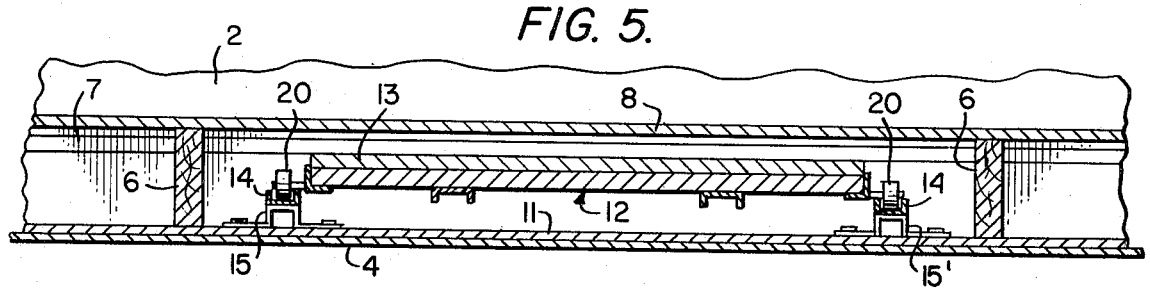
FIG. 5 is a fragmentary transverse sectional view as taken on the line 5—5 of FIG. 4.
Figure 6:
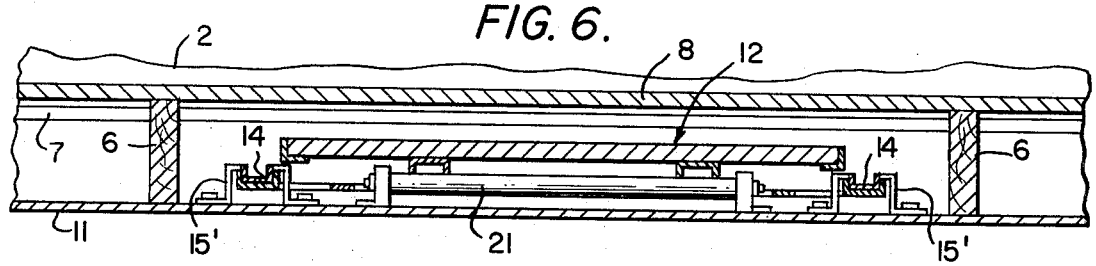
FIG. 6 is another fragmentary transverse sectional view as taken on the line 6—6 of FIG. 4.
Figure 7:
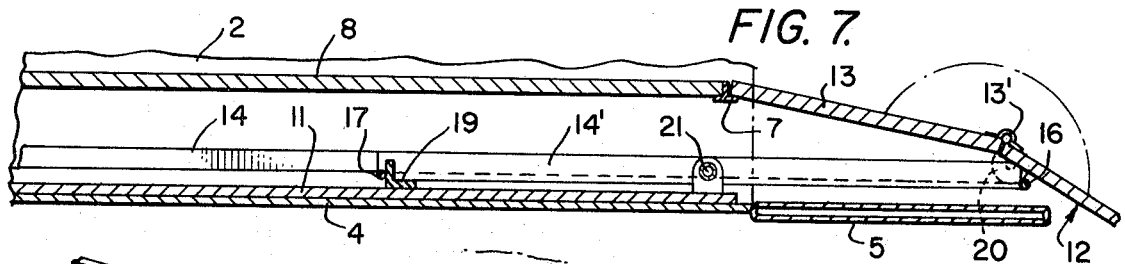
FIG. 7 is a fragmentary longitudinal sectional view as taken on the line 7—7 of FIG. 3, and better showing the details of the foldable bridge flap which bridges the tailgate of the truck body when the gangplank is in use.
Figure 8:
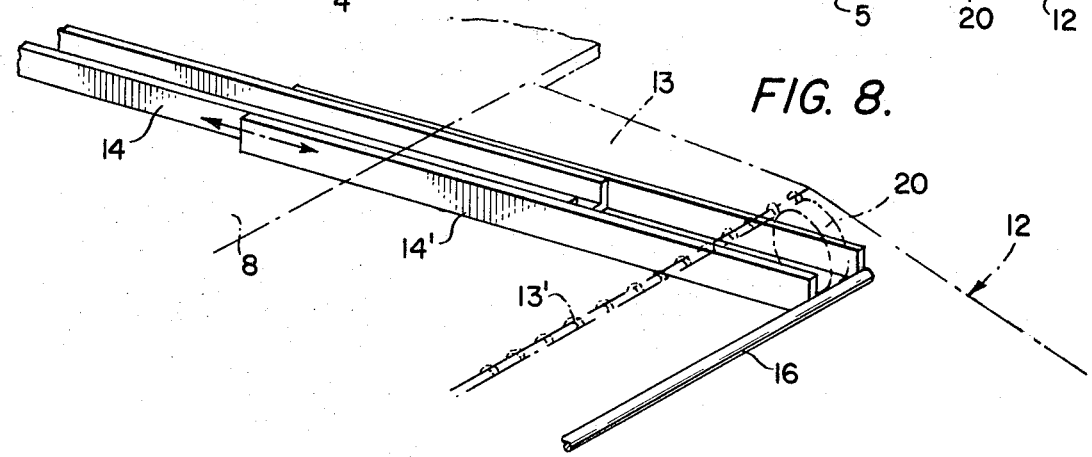
FIG. 8 is a fragmentary perspective view showing a portion of one of the fixed trackways and its cooperating sliding track which is extensible therefrom as when the gangplank, partially shown in broken lines, is in use.
Figure 9:
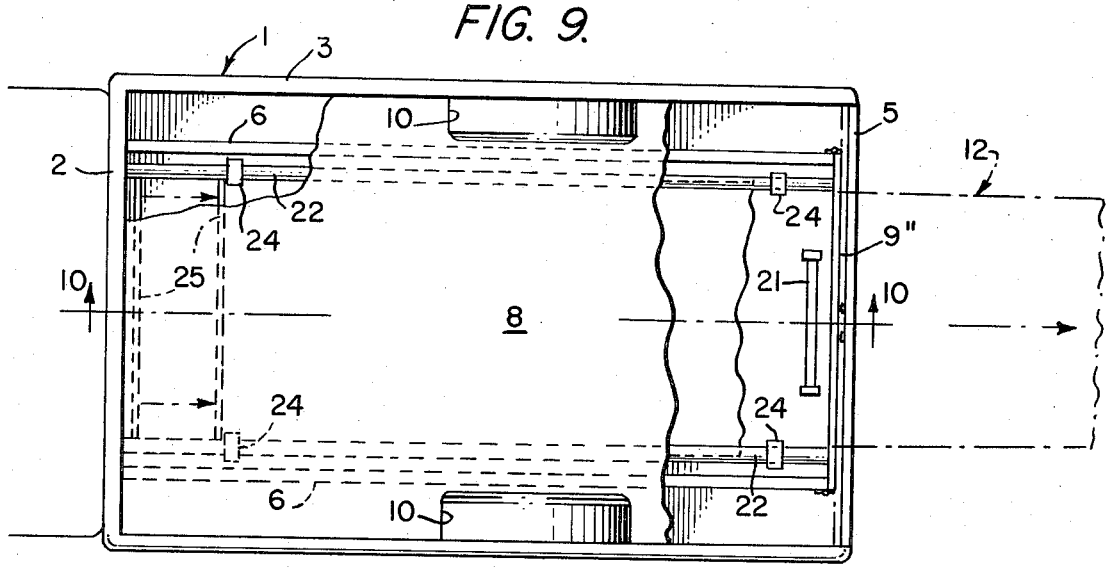
FIG. 9 is a top plan view generally similar to FIG. 2, but showing a modified embodiment of our invention.
Figure 10:
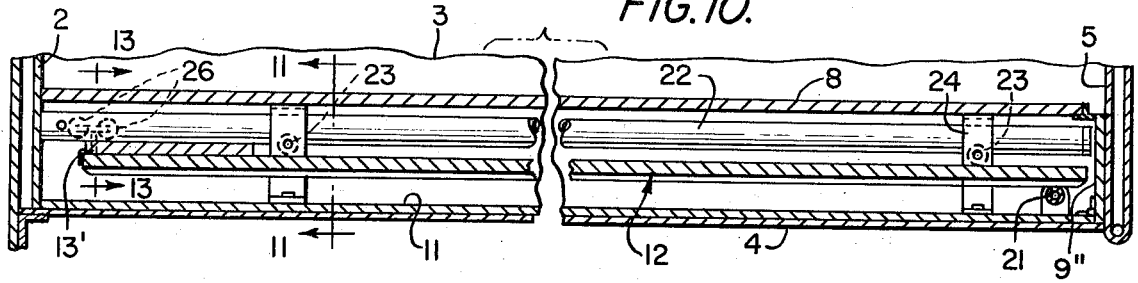
FIG. 10 is a longitudinal sectional view as taken on the line 10—10 of FIG. 9.
Figure 11:
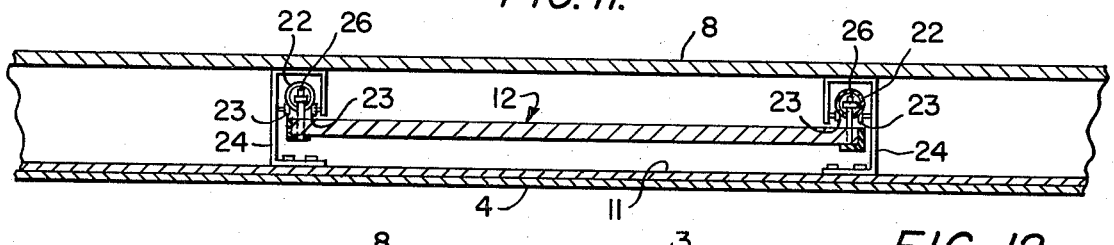
FIG. 11 is a transverse sectional view as taken on line 11—11 of FIG. 10.
Figure 12:
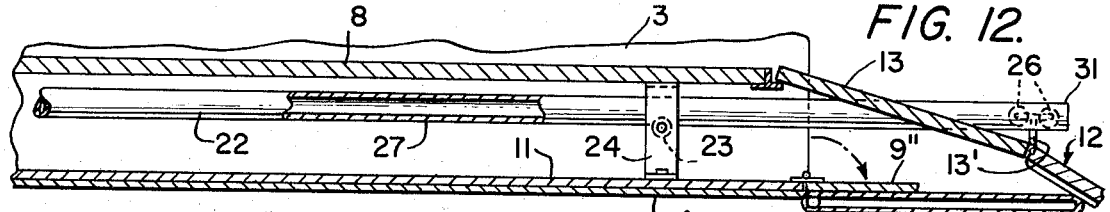
FIG. 12 is a fragmentary longitudinal sectional view showing the extended positions of the gangplank and one of the suspension tracks therefor as when the gangplank is in use.
Figure 13:
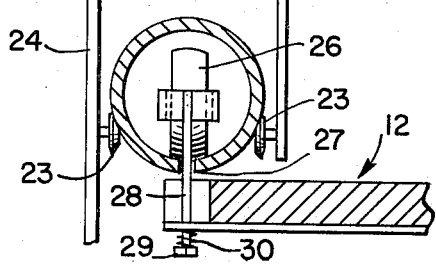
FIG. 13 is a fragmentary detail sectional view as taken on line 13—13 of FIG. 10 through one of the suspension tracks and its suspend which suspended the gankplank as partially shown in this view.
Figure 14:
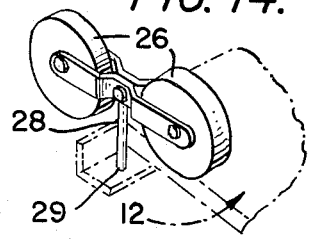
FIG. 14 is a fragmentary perspective view better showing the details of one of the tandem roller assemblies from which the gangplank is suspended from trackways of FIGS. 9 to 13.

Within the body 1 and extending longitudinally thereof along the bed or floor 4 near the opposite side walls of the body is a pair of laterally spaced paralle sills 6,6 which are spanned at intervals by bars or angle irons 7 extended transversely within the body to support a raised deck or load receiving platform 8, said platform being vertically spaced, preferably about six inches, above the bed or floor 4 to define between the sills 6 and between the bed 4 and the raised platform 8 a storage compartment having its entrance at the rear of the truck body 1. Closure means 9 normally closes the entrance aforesaid, but may be opened at will to afford free access to the storage compartment. In FIGS. 1 to 3, the closure means has the form of double doors 9',9', each hingedly connected to the rear end of one of the sills 6 for swinging movements about a vertical axis, with the doors meeting at the center of the storage compartment when closed, while in FIGS. 9 to 12, a singe continuous door 9" is shown, with the door hingedly mounted at the bottom of the entrance to the storage compartment for swinging movements on a horizontal axis at the rear of the truck body.

The elevated platform 8 may be constructed of aluminum, steel plate, heavy plywood or any other suitable material capable of sustaining loads of the type to be transported by the truck, and the platform may be formed with knockouts 10,10 at its opposite lateral edges to fit around and accommodate the wheel wells which usually project with the body of conventional pick-up trucks.

Also, if desired, a false bottom 11 of heavy plywood or the like may be laid on the bed or floor 4 of the body to provide a smooth flat surface at the bottom of the storage compartment, the advantages of which will be obvious from the following description.

It will be apparent from the foregoing that the fabrication of the storage compartment is largely unitary in its assembly so that the components thereof can be quickly and easily installed in the body of the pick-up truck and removed therefrom with a minimum of effort and without material alteration or modification of the truck body itself.

To facilitate loadng and unloading of the truck, there is provided a gangplank 12 which is fully housed in the storage compartment when not in use, but which may be easily retracted therefrom to form an inclined ramp at the rear of the truck body. The gankplank 12 may be of solid or hollow construction and can be made of metal, metal alloy, wood or other appropriate material, combined with appropriate reinforcing angle irons, T-irons, and/or appropriate fillers, as preferred. At its forward end, the gangplank is preferably provided with a foldable flap 13 which is normally hingedly connected thereto by a transversely extended continuous hinge 13' of the so-called piano hinge type, whch permits the flap to be swung rearwardly so as to overlie upon the upper face of the gangplank when not in use, but which can be unfolded to extend forward therefrom so as to bridge the tailgate 5 when the latter is open, with the forward end of the flap meeting or abutting the rear edge of the raised deck or load-receiving platform 8. When so extended, the ramp lies on such a relatively shallow or easy incline as to allow loads such as snowmobiles, midget autos, motorcycles, motor-bikes, power mowers and other self-propelled equipment, or other non-self-propelled loads to either be moved up and down the ramp under their own power, or manually with a minimum of physical effort when loading the same onto the truck or unloading the same therefrom.

To facilitate movement of the gangplank into and out of the storage compartment beneath the load-receiving platform or deck 8, the gangplank is provided with rollers at its forward end adjacent the hinged axis of the foldable bridge flap 13, said rollers coacting with tracks or guideways disposed within the storage compartment and being partially extensible therefrom to approximately the rear edge of the tailgate 5 when the latter is opened to its horizontal position allowing access to the gangplank when housed in the storage compartment.

In one embodiment of the rollers and trackways, as depicted in FIGS. 1 to 8, two fixed tracks 14,14 are suitably welded or otherwise fixed to mounting brackets 15, which are bolted or otherwise anchored to the bottom 11 of the storage compartment adjacent to the forward end and near the middle of the compartment, with the respective tracks being laterally spaced apart and extending substantially the full length of the compartment near the opposite sides thereof and between the sills 6,6. Near the rear ends of the tracks 14, additional mounting brackets 15' are anchored to the tracks and define a space between the tracks and the brackets to slidably receive therethrough shorter movable tracks 14' slidably embracing the fixed tracks 14. Both the fixed and slidable tracks are preferably U-shaped or channel-shaped in transverse cross-section and nest one in the other, with the forward and rear ends of the shorter sliding tracks 14' being respectively connected together by tie-bars 16 and 17, and the tracks 14' also being preferably connected at intermediate points to the rear tie-bar 17 by braces 18,18 which strengthen and help to rigidify the sliding track assembly as a freely movable unit which forms an extension of the fixed tracks when the unit is withdrawn to its extended position. The slidable track assembly is preferably about half as long as the length of the storage compartment and is capable of being partially withdrawn from the compartment as far as the rear edge of the open tailgate 5, at which position the tie-bar 16 engages a fixed stop member 19 anchored to the bottom of the storage compartment of the movable track assembly. It will be apparent that other forms of limit stops may be substituted for the member 19, if preferred, but in any case, the movable track unit, when fully extended to its limit, provides continuous, horizontal trackways from the front end of the storage compartment to the rear edge of the open tailgate.

Receivable in these trackways and freely rollable therein are rollers 20,20 which are rotatably mounted on the gangplank, as by means of a transversely extending axle fixed to the gangplank preferably at or near the pivotal axis of the bridge flap 13, with the rollers disposed at the respective opposite sides of the gangplank. When the gangplank is to be stored in the storage compartment, the rollers 20 can freely roll to the forward extremities of the movable tracts 14' and then onto the fixed tracks 14, until the rollers approach the forward ends of the latter, at which point the gangplank will be fully retracted in the storage compartment. During or at the end of the retracting movement of the gangplank, the movable track assembly can also be retracted far enough (preferably at least as far as the intermediate fixed track anchor brackets) to allow closing of the closure doors 9' at the entrance to the storage compartment, as well as closing of the tailgate 5 at the rear of the truck body. In such condition, the gangplank is fully protected from dust, dirt and the weather elements when the gangplank is not in use, but allows the gangplank to be quickly and easily withdrawn from the storage compartment for convenient use as a loading or unloading ramp when so desired.

To further facilitate handling of the gangplank, especially when it is of heavy duty form, a transversely extended roller 21 is preferably mounted on the bottom or base of the storage compartment near its entrance to rollingly engage the lower face of the gangplank and partially support the weight of the gangplank as it is manually retracted into and withdrawn from the compartment.

In the modified form of our invention, as illustrated in FIGS. 9 to 14, the construction and operation is basically the same, but the gangplank 12 is suspended from the trackways which are supported above the bed or floor of the storage compartment, and the trackways are wholly movable longitudinally of the compartment to a limited extent without the need of any separate auxiliary track assembly unit as provided in the form of the invention as first described in the forgoing.

Referring particularly to FIGS. 9 to 13, it will be seen that the trackways 22,22, which may be circular or rectangular in transverse cross-section, are supported on laterally spaced pairs of rollers 23,23 carried by suitable mounting brackets or hangers 24 which are anchored within the storage compartment in laterally opposed pairs positioned near the entrance of the compartment and also rearwardly spaced from the front end of the compartment, respectively. At their extreme forward ends, the trackways 22,22 are rigidly connected together by a tie-bar 25, which also acts as a stop member engageable with the forward brackets 24 to limit rearward movement of the trackways when extended from the storage compartment to the rear edge of the open tailgate 5. In this form of the invention, the compartment entrance is preferably pprovided with a single continuous closure door 9" which is hingedly mounted on a continuous transversely extended hinge 13' to allow swinging movements of the door on a vertical arc.

Disposed within each trackway 22 is a pair of tandem rollers 26,26, which are freely movable back and forth therein. Depending from each tendem assembly and freely sliding in an elongated slot 27 provided in the bottom of each trackway 22 is a suspension link 28 having its upper end pivotally connected to the roller assembly and its lower end connected to the gangplank 12 adjacent to the pivotal axis of the hinged flap 13. The slots 27 are somewhat narrower in width than the width of the rollers 26 so that the rollers cannot drop through the slots as they roll within the trackways. The connection links 29 of the lower ends of the suspension links to the gangplank preferably is such as to allow limited yieldable movement as afforded by springs 30 which also serve to absorb sudden shocks or jolts which may be imposed on the gangplank during loading and unloading of the truck.

To prevent inadvertent displacement of the rollers 26 from the trackways when they reach the rearward limit of their travel therein, and to assist in protecting the rollers, the trackways 22 are closed at their rear ends by end-caps 31 which are preferably removably mounted thereon in any suitable manner.

The foldable flap 13 of the gangplank may be held in its folded position by a latch (not shown) and if desired may be normally urged by spring means (not shown) toward its unfolded or extended position when the latch is released.

While the specific details of our invention have been described and illustrated herein, the invention is not confined thereto as appropriate changes and alterations may be made without departing from the spirit thereof as defined in the appended claims.

We claim:

1. The combination with a load-receiving platform, of means defining a storage compartment beneath said platform, said compartment defining an entrance at one end of the same, a gangplank normally stored within said compartment when not in use but being withdrawable from said compartment to provide a ramp extended from the adjacent edge of the platform, said ramp having roller means mounted thereon at one end thereof, and guide track means mounted in the storage compartment and extended longitudinally thereof for receiving and guiding the roller means aforesaid during withdrawal and retraction of the gangplank out of and into the storage compartment, said track means being movably supported above the bottom of the storage compartment for permitting partial extension of the track means beyond the entrance of the compartment, and the gangplank being suspended from and below the track means by the gangplank rollers coacting therewith.

2. The combination as defined in claim 1, wherein the gangplank is provided with a foldable flap which is hingedly connected to one end thereof, said flap normally overlying the ramp in a reversely folded position when the ramp is retracted into the storage compartment but being pivotally movable to an unfolded position to form an extended continuation of the gangplank when the gangplank is withdrawn from the storage compartment.

3. The combination as defined in claim 1, wherein the load receiving platform is mounted within the body of a pick-up truck in vertically spaced relation to the floor of the body and defines with the body the storage compartment for the gangplank, the body of the pick-up truck having the usual tailgate hingedly connected to the rear end of the body and which is bridged by the gangplank when the tailgate is opened and the gangplank is withdrawn from the storage compartment, and said gangplank including a bridge segment suspended from the guide track means and movable with the gangplank to form an extension of the gangplank which bridges the tailgate when the tailgate is opened to a horizontal position and the gangplank is withdrawn from the storage compartment into its loading position.

* * * * *